United States Patent
Takahashi et al.

(10) Patent No.: US 10,381,620 B2
(45) Date of Patent: Aug. 13, 2019

(54) BATTERY UNIT

(71) Applicant: HONDA MOTOR CO., LTD., Tokyo (JP)

(72) Inventors: Masaki Takahashi, Saitama (JP); Ryo Fujii, Saitama (JP); Suguru Umetsu, Saitama (JP); Atsushi Mizutani, Saitama (JP); Eiji Koike, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/123,113

(22) Filed: Sep. 6, 2018

(65) Prior Publication Data

US 2019/0081296 A1 Mar. 14, 2019

(30) Foreign Application Priority Data

Sep. 14, 2017 (JP) .................. 2017-176909

(51) Int. Cl.
*B60K 1/04* (2019.01)
*H01M 2/10* (2006.01)
*H01M 10/613* (2014.01)

(52) U.S. Cl.
CPC ............ *H01M 2/1083* (2013.01); *B60K 1/04* (2013.01); *H01M 10/613* (2015.04)

(58) Field of Classification Search
CPC ............ B60K 1/04; B60K 2001/0405; B60K 2001/0416; B60K 2001/0438
USPC ..................................... 180/68.5
See application file for complete search history.

(56) References Cited

U.S. PATENT DOCUMENTS

| | | | |
|---|---|---|---|
| 5,643,693 A * | 7/1997 | Hill | H01M 2/1083 429/121 |
| 6,220,380 B1 | 4/2001 | Mita et al. | |
| 6,371,229 B1 * | 4/2002 | Kakiuchi | B60K 5/1208 180/291 |
| 6,827,168 B2 * | 12/2004 | Miyazaki | B60R 19/00 180/274 |

(Continued)

FOREIGN PATENT DOCUMENTS

| | | |
|---|---|---|
| JP | H11-180163 A | 7/1999 |
| JP | 2001-023700 A | 1/2001 |

(Continued)

OTHER PUBLICATIONS

Feb. 19, 2019, Japanese Office Action issued for related JP Application No. 2017-176909.

*Primary Examiner* — Jeffrey J Restifo
(74) *Attorney, Agent, or Firm* — Paratus Law Group, PLLC (57) ABSTRACT

A battery unit mounted on a vehicle, includes: a battery; a first electric junction box electrically connected to the battery; a second electric junction box electrically connected to the battery; and a case accommodating the battery, the first electric junction box, and the second electric junction box. The battery, the first electric junction box, and the second electric junction box are arranged in this order in a vehicle width direction. The first electric junction box is disposed along a side surface of one side of the battery in the vehicle width direction. The second electric junction box is held by a bracket which is inclined upward or downward, as the second electric junction box is separated from the first electric junction box in the vehicle width direction.

7 Claims, 9 Drawing Sheets

(56) References Cited

U.S. PATENT DOCUMENTS

| | | | | |
|---|---|---|---|---|
| 7,021,412 B2* | 4/2006 | Koike | ................. | H01M 2/1055 180/68.5 |
| 7,025,160 B2* | 4/2006 | Awakawa | ................. | B60K 1/04 180/68.5 |
| 7,678,494 B2* | 3/2010 | Tsuchiya | ............. | B60L 11/1874 180/68.5 |
| 7,913,787 B2* | 3/2011 | Watanabe | ................ | B60K 1/04 180/68.5 |
| 8,302,716 B2* | 11/2012 | Yoda | ....................... | B60R 16/04 180/68.5 |
| 8,701,810 B2* | 4/2014 | Marukawa | ............. | B60R 16/04 180/65.1 |
| 8,720,627 B2* | 5/2014 | Suzuki | .................... | B60R 16/04 180/68.5 |
| 8,794,366 B2* | 8/2014 | Taguchi | ................. | B60R 16/04 180/68.5 |
| 8,950,537 B2* | 2/2015 | Yokoyama | .......... | B60R 16/0239 180/68.5 |
| 9,033,083 B2* | 5/2015 | Kashiwagi | .......... | B60L 11/1816 180/68.5 |
| 9,203,233 B2* | 12/2015 | Kitami | ...................... | B60L 3/04 |
| 9,205,749 B2* | 12/2015 | Sakamoto | ................ | B60K 1/00 |
| 9,260,065 B2* | 2/2016 | Tanigaki | .................. | B60K 1/04 |
| 9,281,505 B2* | 3/2016 | Hihara | .................... | B60K 1/04 |
| 9,283,838 B2* | 3/2016 | Ohashi | .................... | B60K 1/04 |
| 9,308,805 B2* | 4/2016 | Shiromura | ............... | B60K 1/04 |
| 9,490,459 B2* | 11/2016 | Takizawa | ............ | H01M 10/625 |
| 9,758,194 B2* | 9/2017 | Inagaki | .................... | B60K 1/04 |
| 9,821,645 B2* | 11/2017 | Hayashi | ................... | B60K 1/00 |
| 9,873,456 B2* | 1/2018 | Hara | ...................... | B60K 1/04 |
| 9,975,416 B2* | 5/2018 | Hara | ...................... | B62D 25/20 |

FOREIGN PATENT DOCUMENTS

| | | | |
|---|---|---|---|
| JP | 2004-017808 A | 1/2004 | |
| JP | 2017-094788 A | 6/2017 | |

* cited by examiner

BATTERY UNIT

CROSS-REFERENCE TO RELATED APPLICATION(S)

This application claims priority from Japanese Patent Application No. 2017-176909 filed on Sep. 14, 2017, the entire contents of which are incorporated herein by reference.

FIELD

The present invention relates to a battery unit mounted on a vehicle.

BACKGROUND

In vehicles such as a Hybrid Electrical Vehicle (HEV) and an Electric Vehicle (EV), a battery unit accommodating a battery is mounted. Electric power of the battery is supplied to a power conversion device (inverter or the like) and other electric devices (air conditioner and the like) via a switching element (a contactor, a relay, or the like) for controlling the supply of the electric power and a circuit breaker (fuse or the like) for shutting off an electric power transmission path in the case of an abnormality.

The switching element and the circuit breaker are normally mounted on a vehicle in a state where the switching element and the circuit breaker are accommodated in an electric junction box (junction box). For example, JP-A-2017-94788 discloses that a plurality of electric junction boxes is provided and a switching element and a circuit breaker are dispersedly accommodated in each electric junction box.

Electric components provided in an electric junction box include important components (for example, a switching element) of which destruction should be avoided event in the event of a vehicle collision. In the related arts, the electric junction box provided with important components is accommodated in a case with a battery as a battery unit together, in such a manner that destruction of the important components is prevented in the event of a vehicle collision. However, when a large collision load which can deform the battery unit is input, there is a possibility that the electric junction box in the battery unit is also crushed, and thus it is required to further improve the durability against the collision load.

SUMMARY

The invention provides a battery unit capable of securing a compression stroke in the event of a vehicle collision and protecting important components by controlling deformation in the event of crushing.

According to an aspect of the invention, there is provided a battery unit mounted on a vehicle, including:
a battery;
a first electric junction box electrically connected to the battery;
a second electric junction box electrically connected to the battery; and
a case accommodating the battery, the first electric junction box, and the second electric junction box, wherein
the battery, the first electric junction box, and the second electric junction box are arranged in this order in a vehicle width direction,
the first electric junction box is disposed along a side surface of one side of the battery in the vehicle width direction, and
the second electric junction box is held by a bracket which is inclined upward or downward, as the second electric junction box is separated from the first electric junction box in the vehicle width direction.

According to the aspect described above, it is possible to secure a compression stroke in the event of a vehicle side collision by deformation of the bracket. That is, when a side collision load is input, the posture of the second electric junction box changes from an inclined attitude to a vertical attitude due to the deformation of the bracket. Thus, compared to a case where the bracket and the second electric junction box are arranged in a horizontal attitude, the side collision load is less likely to be input to the first electric junction box or the battery. Therefore, when important components are provided in the first electric junction box, it is possible to protect the important components by controlling deformation in the event of crushing.

DETAILED DESCRIPTION

Hereinafter, an embodiment of the present invention will be described with reference to the drawings. The drawings are to be seen in a direction of a reference character and, in the following description, the front and rear, the left and right, and the up and down are indicated in directions viewed from a driver. Further, the front side of a vehicle is denoted by Fr, the rear side is denoted by Rr, the left side is denoted by L, the right side is denoted by R, the upper side is denoted by U, and the lower side is denoted by D in the drawings.

[Battery Unit]

As illustrated in FIGS. 1 to 4, a battery unit 1 according to the embodiment of the invention is mounted on a vehicle V such as HEV, EV, or the like. The vehicle V includes a battery unit accommodation portion H in a floor panel FP and the battery unit 1 is accommodated in the battery unit accommodating portion H and fastened to the floor panel FP.

The battery unit 1 includes a battery 2, a cooling system component for cooling the battery 2, an electric power transmission system component for transmitting electric power of the battery 2, a control system component for controlling the battery 2, and a case 3 for accommodating those components.

[Battery]

The battery 2 includes a battery module 22 constituted of a plurality of cells 21 stacked in a vehicle width direction and a battery frame 23 (see FIG. 6) for holding the battery module 22. Although the battery 2 of the embodiment includes two battery modules 22 arranged in two stages, upper and lower, the number of the battery modules 22 and the cells 21 can be appropriately changed. In addition, the plurality of cells 21 are arranged in parallel via gaps (not illustrated) along a front-rear direction and are cooled by cooling air passing through those gaps.

[Case]

The case 3 includes a case body 31 and a lid 32 covering an opening of the case body 31. The case body 31 is a box member which has a substantially rectangular parallelepiped shape elongated in the vehicle width direction and of which the upper portion is opened and a flange portion 31a extending outward over the entire circumference is formed at the opening edge portion.

The lid 32 includes a flange portion 32a extending outward from an outer peripheral edge portion over the entire circumference, an intake hole 32b for sucking cooling air into the battery unit 1 from a cabin Va, and an exhaust hole 32c for discharging the cooling air that cooled the battery 2 to the outside (in the embodiment, a cargo room Vb) of the battery unit 1.

Figure 4:
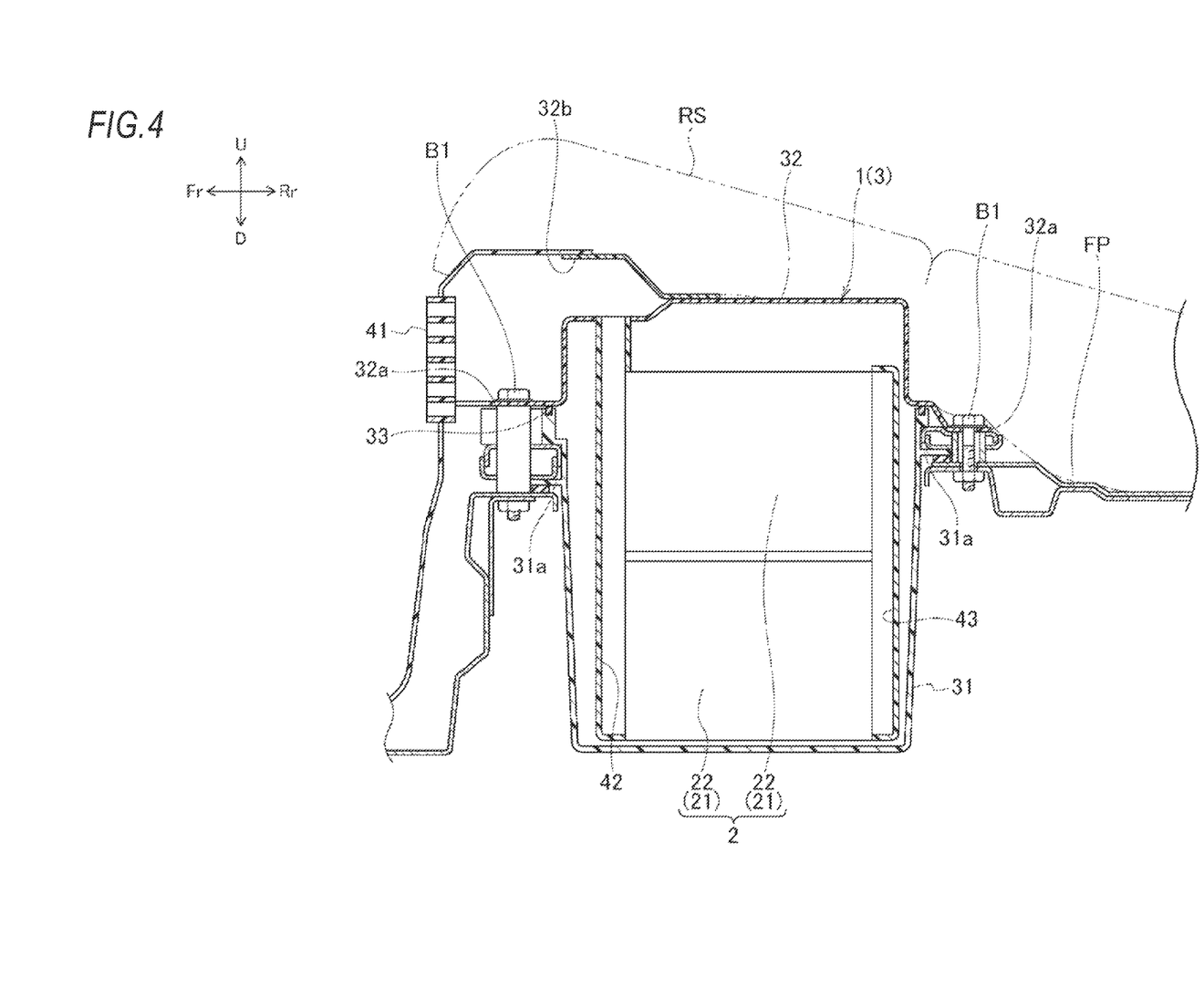
FIG. 4 is a cross-sectional view taken along the line Y-Y in FIG. 3.

As illustrated in FIG. 4, the flange portion 32a of the lid 32 is overlapped on the flange portion 31a of the case body 31 via a seal member 33 having an annular shape. Both overlapped flange portions 31a and 32a are fastened to the floor panel FP via a plurality of bolts B1.

[Cooling System Component]

The cooling system component constitutes a cooling airflow path for cooling the battery 2 with cooling air drawn into the battery unit 1 from the cabin Va and exhausting the cooling air after cooling to the outside of the battery unit 1. The cooling system component of the embodiment includes an intake grill 41, an internal air intake duct 42, a first internal exhaust duct 43, a cooling fan 44, and a second internal exhaust duct (not illustrated).

The intake grill 41 is attached to the lower front side of a rear seat RS and takes in cooling air into the battery unit 1 via the intake hole 32b formed in the lid 32. The internal air intake duct 42 communicates with the intake grill 41 and covers the front surface of the battery 2. The first internal exhaust duct 43 covers the rear surface of the battery 2 and communicates with the cooling fan 44 via an internal space of the battery unit 1.

When the cooling fan 44 is driven, cooling air is sucked into the internal air intake duct 42 from the cabin Va via the intake grill 41 and this cooling air flows into the first internal exhaust duct 43 through the gap of the battery 2, and thus each cell 21 of the battery 2 is cooled. Next, the cooling air which cools the battery 2 and flows into the first internal exhaust duct 43 is discharged into the internal space of the battery unit 1, and then the cooling air is sucked into the cooling fan 44 and it is exhausted to the outside of the battery unit 1 via the second internal exhaust duct and the exhaust hole 32c of the lid 32. In the embodiment, the cooling air discharged from the exhaust hole 32c of the lid 32 is discharged to the cargo room Vb via an external exhaust duct 46, but the discharge destination of the cooling air may be cabin Va.

Figure 9:
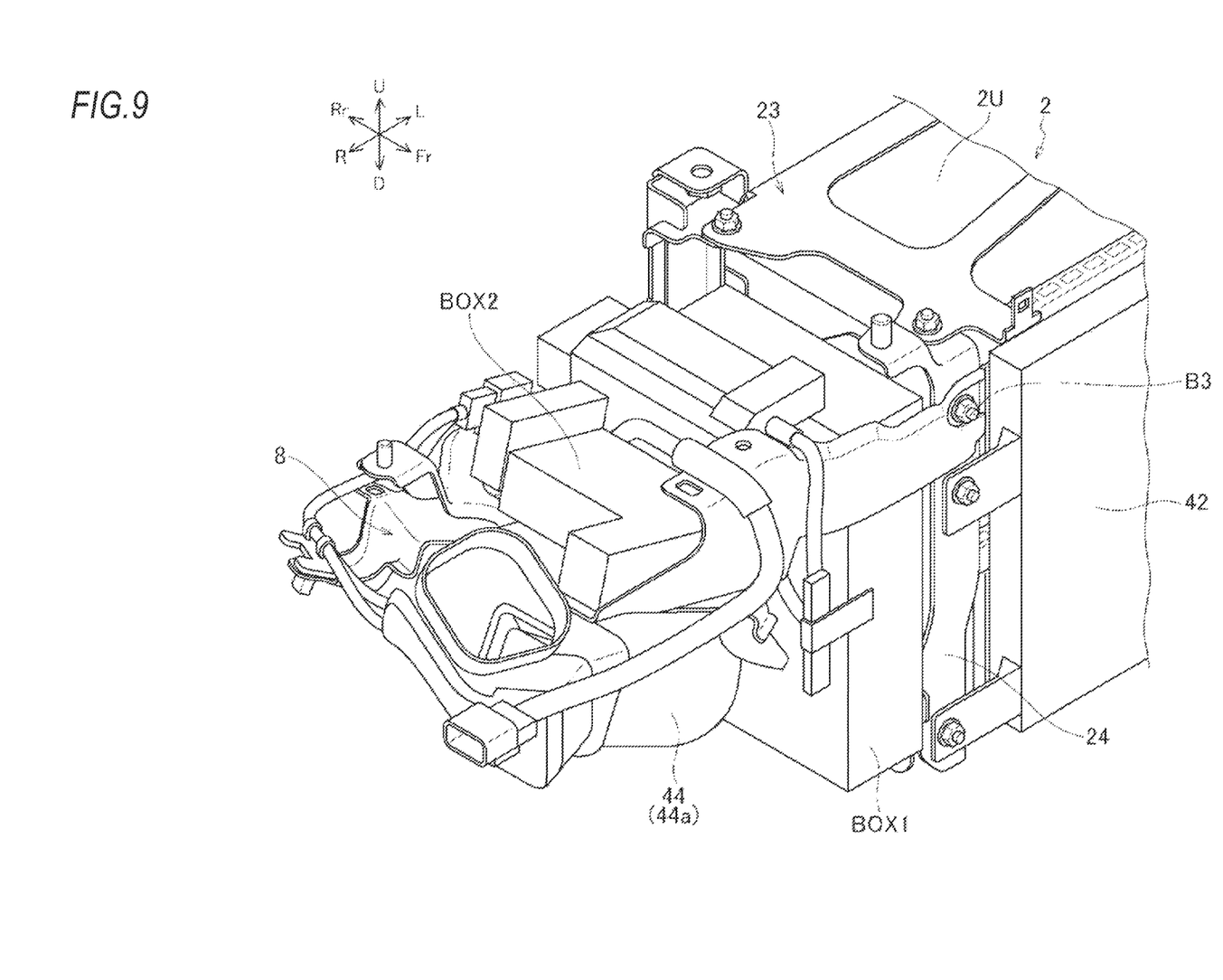
FIG. 9 is a perspective view illustrating the right side portion of the battery to which a cooling fan, a connecting wire, and the like are attached.

Referring also to FIG. 9, the cooling fan 44 of the embodiment is a sirocco fan and includes a fan case 44a, a rotary fan installed in the fan case 44a, and a motor disposed at the center of the rotary fan to rotate the rotary fan.

[Electric Power Transmission System Component]

Figure 1:
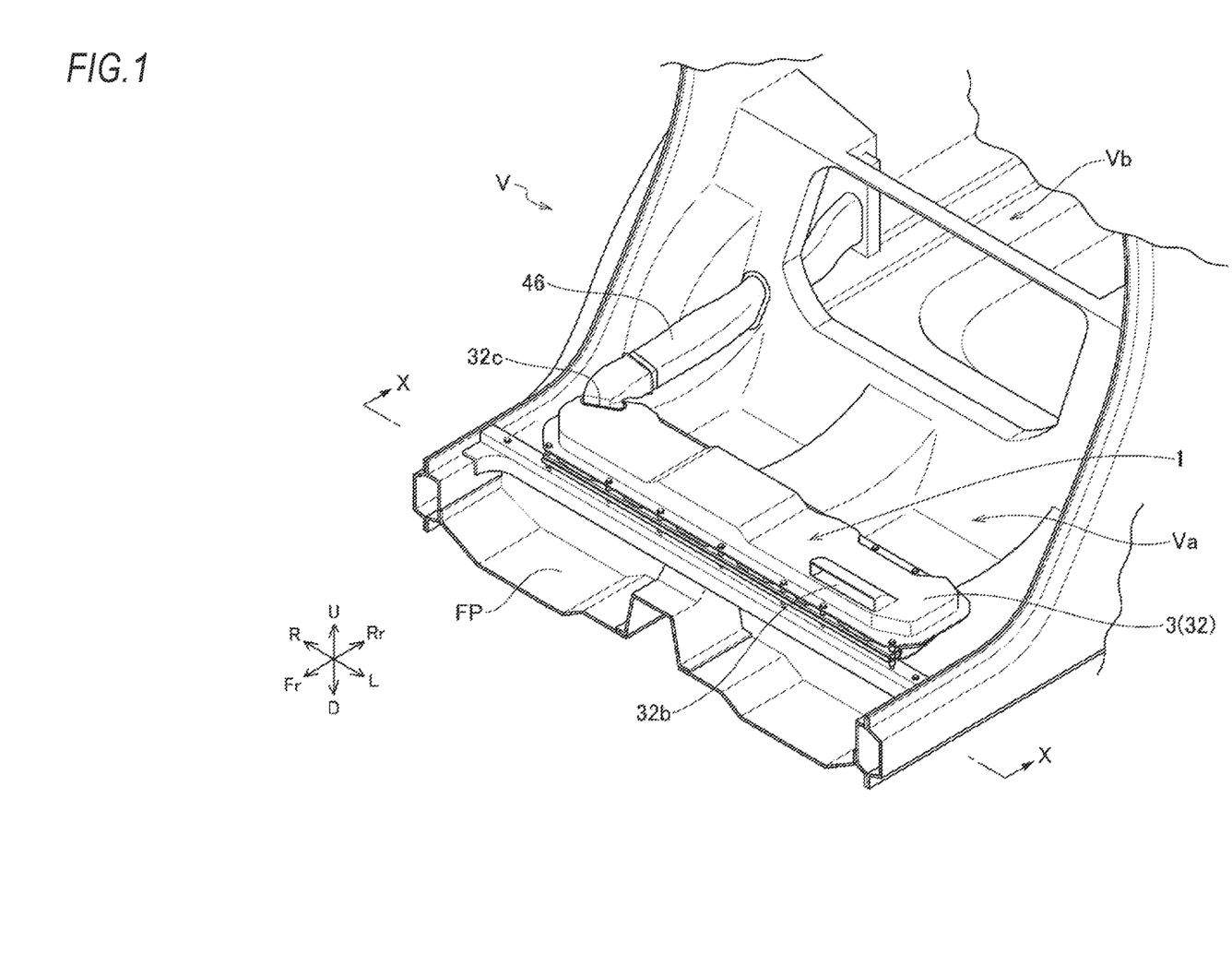
FIG. 1 is a perspective view illustrating a part of a vehicle on which a battery unit according to an embodiment of the invention is mounted and is a perspective view of a floor panel and the battery unit of the vehicle as seen obliquely from the front forward.
Figure 2:
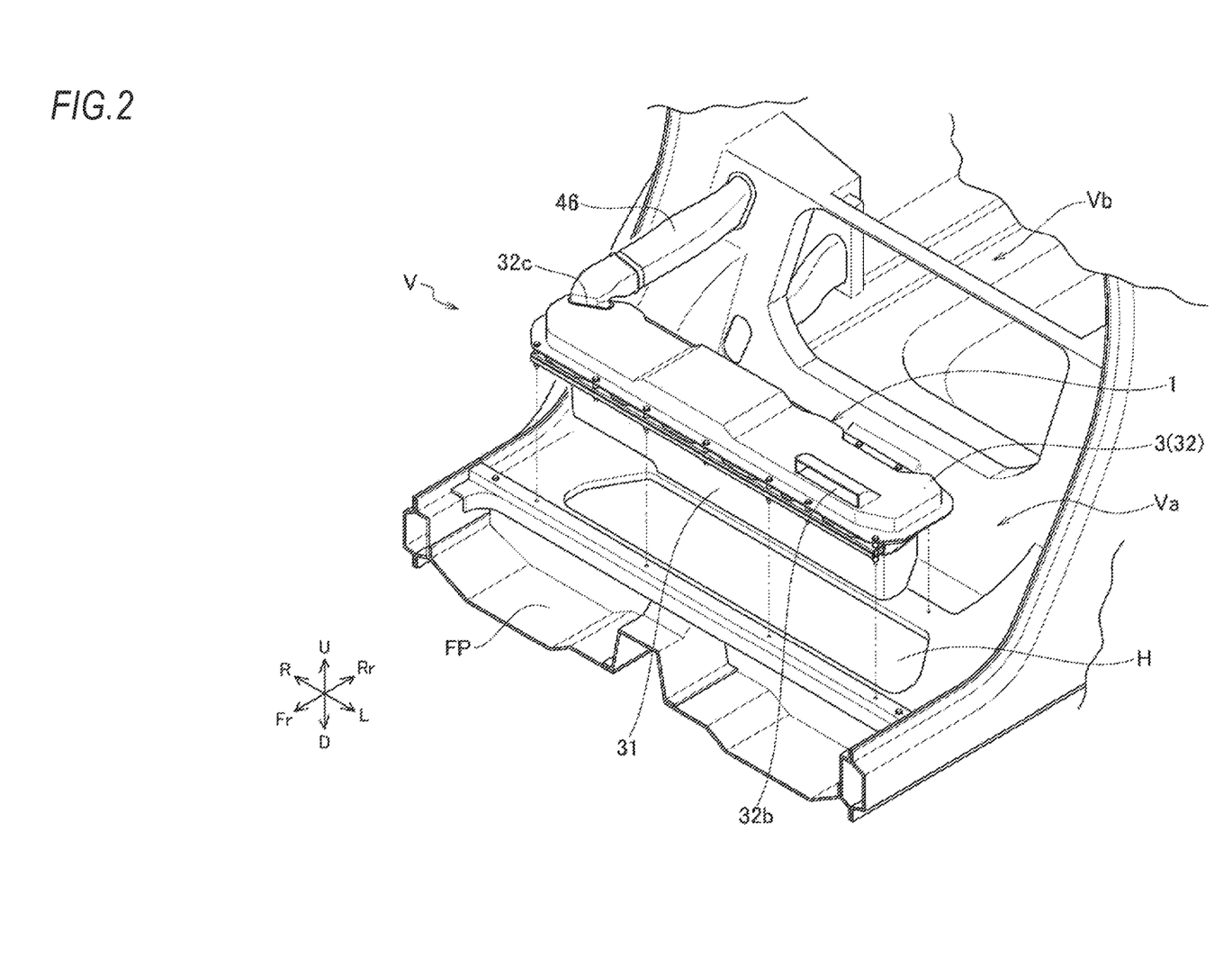
FIG. 2 is an exploded perspective view of the battery unit floating from the floor panel and a battery unit accommodation portion of a vehicle as seen obliquely from the front forward.
Figure 3:
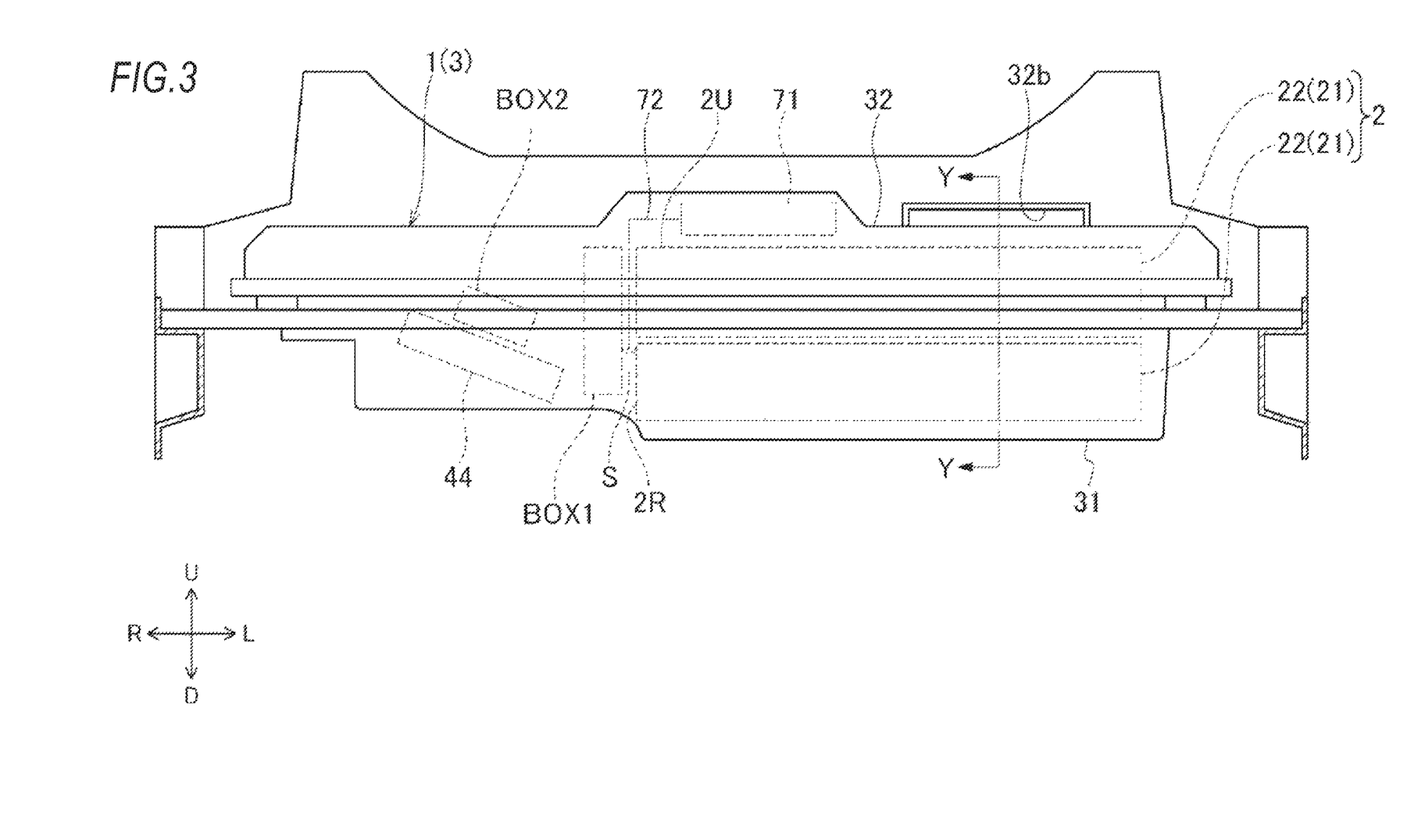
FIG. 3 is a cross-sectional view taken along the line X-X in FIG. 1.
Figure 5:
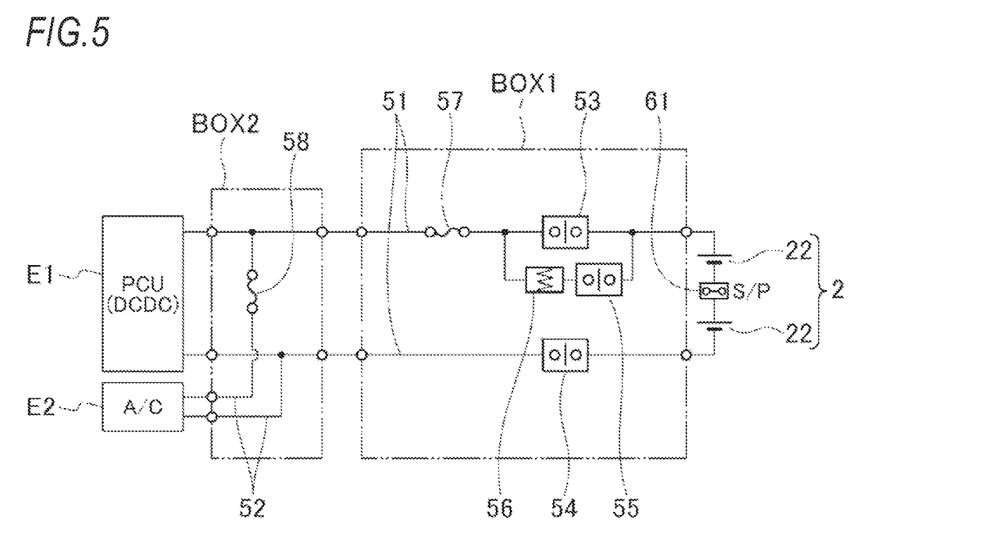
FIG. 5 is a circuit diagram illustrating an electric power transmission path of the battery unit.

As illustrated in FIGS. 3 and 5, the electric power transmission system component constitutes a first electric power transmission path 51 for transmitting the electric power of the battery 2 to a first electric device E1 in the outside and a second electric power transmission path 52 for branching from the first electric power transmission path 51 and transferring the electric power to a second electric device E2 in the outside. The control system component of the embodiment includes first to third switching elements 53, 54, and 55 for controlling the supply of power, a resistor 56, and first and second circuit breakers 57 and 58 for shutting off the electric power transmission paths 51 and 52 in the case of an abnormality.

The first electric device E1 of the embodiment is a power control unit (PCU) and includes an inverter (power conversion device) which converts DC power to AC power and a DC-DC converter (voltage conversion device) which converts high voltage power to low voltage power. In addition, the second electric device E2 of the embodiment is an electric air conditioner (A/C) and is an electric appliance less important than the PCU.

The first switching element 53 and the second switching element 54 are provided in the first electric power transmission path 51 and are electric components for controlling the supply of electric power to the first electric device E1 and the second electric device E2. The first switching element 53 is a positive main contactor provided on the plus side of the first electric power transmission path 51 and the second switching element 54 is a negative main contactor provided on the minus side of the first electric power transmission path 51.

The third switching element 55 and the resistor 56 are connected in parallel with the first switching element 53 in the first electric power transmission path 51, and are electric components for energizing a precharge path prior to the first switching element 53 in order to avoid excessive inrush current. The switching element 55 is a precharge contactor connected in parallel with the first switching element 53 and the resistor 56 is a precharge resistor connected in series with the third switching element 55.

The first circuit breaker 57 is provided to shut off the first electric power transmission path 51 in the case of an abnormality and the second circuit breaker 58 is an electrical component provided for shutting off the second electric power transmission path 52 in the case of an abnormality. Both the first circuit breaker 57 and the second circuit breaker 58 of the embodiment are fuses.

The electric power transmission system components are installed in the battery unit 1 in a state where the components are provided in a first electric junction box BOX1 and a second electric junction box BOX2. Specifically, the first electric junction box BOX1 is provided with first to third switching elements 53, 54 and 55, the resistor 56, and the first circuit breaker 57 and is disposed on the first electric power transmission path 51. The second electrical junction box BOX2 is provided with the second circuit breaker 58 and is disposed on the second electric power transmission path 52. Those electric components constituting the first electric power transmission path 51 and accommodated in the first electric junction box BOX1 are important components of which destruction should be avoided even in the event of a vehicle collision than the second circuit breaker 58 constituting the second electric power transmission path 52 and accommodated in the second electric junction box BOX2. The first electric power transmission path 51 does not pass through the second circuit breaker 58 provided in the second electric junction box BOX2, and thus power can be supplied between the battery 2 and the first electric device E1 even when the second circuit breaker 58 provided in the second electric junction box BOX2 is destroyed.

In FIG. 5, reference numeral 61 denotes a service plug for cutting off the output of the battery 2 in response to a manual operation at the time of maintenance and inspection and the plug is provided on a path for electrically connecting the two battery modules 22.

[Control System Component]

The control system component includes an electronic control unit (battery ECU) 71 for controlling the battery 2. The electronic control unit 71 is electrically connected to the battery 2 via a connection line 72. The electronic control unit 71 and the connection line 72 are important components of which destruction should be avoided even in the event of a vehicle collision and, as illustrated in FIG. 3, the electronic control unit 71 of the embodiment is disposed on an upper surface 2U of the battery 2 to avoid input of a collision load.

[Arrangement and Holding Structure of Electric Junction Box and Cooling Fan]

Next, the arrangement and the holding structure of the electric junction boxes BOX1 and BOX2 and the cooling fan 44 will be described with reference to FIGS. 3 and 6 to 9.

Figure 8:
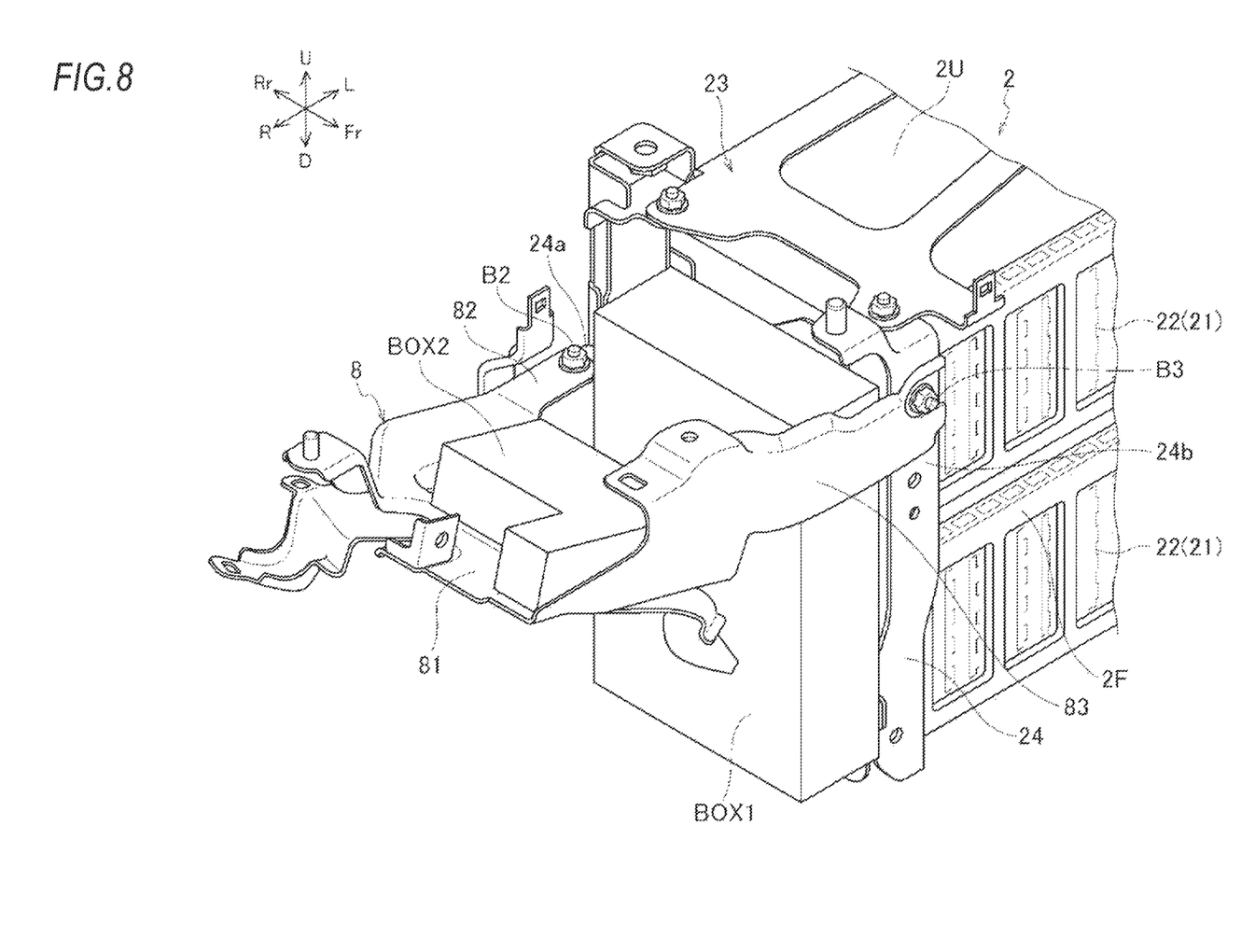
FIG. 8 is a perspective view illustrating the right side portion of the battery to which a first electric junction box and a second electric junction box are attached.

As illustrated in FIG. 3, the battery 2, the first electric junction box BOX1, and the second electric junction box BOX2 are arranged in this order from the left side to the right side in the vehicle width direction. The first electric junction box BOX1 is arranged along a right side surface 2R of the battery 2 and, as illustrated in FIGS. 8 and 9, the second electric junction box BOX2 is held by a bracket 8 which is inclined upward (or downward) as it separates from the first electric junction box BOX1 in the vehicle width direction. Further, the arrangement of the first electric junction box BOX1 along the right side surface 2R of the battery 2 means that one surface of the first electric junction box BOX1 facing the right side surface 2R of the battery 2 is arranged in a vertical attitude so as to be substantially parallel to the right side surface 2R of the battery 2. The second electric junction box BOX2 is disposed in an inclined altitude by the bracket 8.

According to such a battery unit 1, when a side collision load is input from one side (right side or left side) of the battery unit 1 in the vehicle width direction in the event of a vehicle side collision where the influence on the battery unit 1 is worried, the compression stroke in the event of a vehicle side collision is secured by the deformation of the bracket 8. That is, when a side collision load is input, the second electric junction box BOX2 is deformed so as to be perpendicular from the inclined attitude by the deformation of the bracket 8. According to such a deformation of the bracket 8 and the second electric junction box BOX2, the side collision load is not likely to be input to the first electric junction box BOX1 or the battery 2, and thus it is possible to protect the important components by providing the important components (switching elements 53, 54, and 55) in the first electric junction box BOX1.

In the embodiment, the first electric junction box BOX1 is disposed on the first electric power transmission path 51 between the first electric device E1 and the battery 2 and the second electric junction box BOX2 is disposed on the second electric power transmission path 52 which branches off from the first electric power transmission path 51 and transmits power to the second electric device E2. The first to third switching elements 53, 54 and 55 for controlling electric power supply and the first circuit breaker 57 for shutting off the first electric power transmission path 51 are provided in the first electric junction box BOX1 and the second circuit breaker 58 for shutting off the second electric power transmission path 52 is provided in the second electric junction box BOX2. Therefore, when the vehicle side collision occurs, it is possible to prevent the destruction of the first to third switching elements 53, 54, and 55 (important components) provided in the first electric junction box BOX1 while the destruction of the second circuit breaker 58 provided in the second electric junction box BOX2 is allowed. As described above, the first electric power transmission path 51 does not pass through the second circuit breaker 58 provided in the second electric junction box BOX2, and thus electric power can be supplied between the battery 2 and the first electric device E1 even when the second circuit breaker 58 provided in the second electric junction box BOX2 is broken.

Further, as illustrated in FIG. 3, a space S is formed between the battery 2 and the first electric junction box BOX1 in the vehicle width direction and the connection line 72 connecting the battery 2 and the electronic control unit 71 is arranged using the space S. In this way, it is possible to protect the connection line 72 using the battery 2 and the first electric junction box BOX1.

In the bracket 8 of the embodiment, not only the second electric junction box BOX2 but also the cooling fan 44 is held. Specifically, the second electric junction box BOX2 is held on an upper surface of the bracket 8 and the cooling fan 44 is held on a lower surface of the bracket 8. In this way, the number of parts can be reduced as compared with a case where the second electric junction box BOX2 and the cooling fan 44 are held by separate brackets. Further, the second electric junction box BOX2 is held on the upper surface of the bracket 8 and the cooling fan 44 is held on the lower surface of the bracket 8, so that the second electric junction box BOX2 and the cooling fan 44 can be held compactly.

Figure 7:
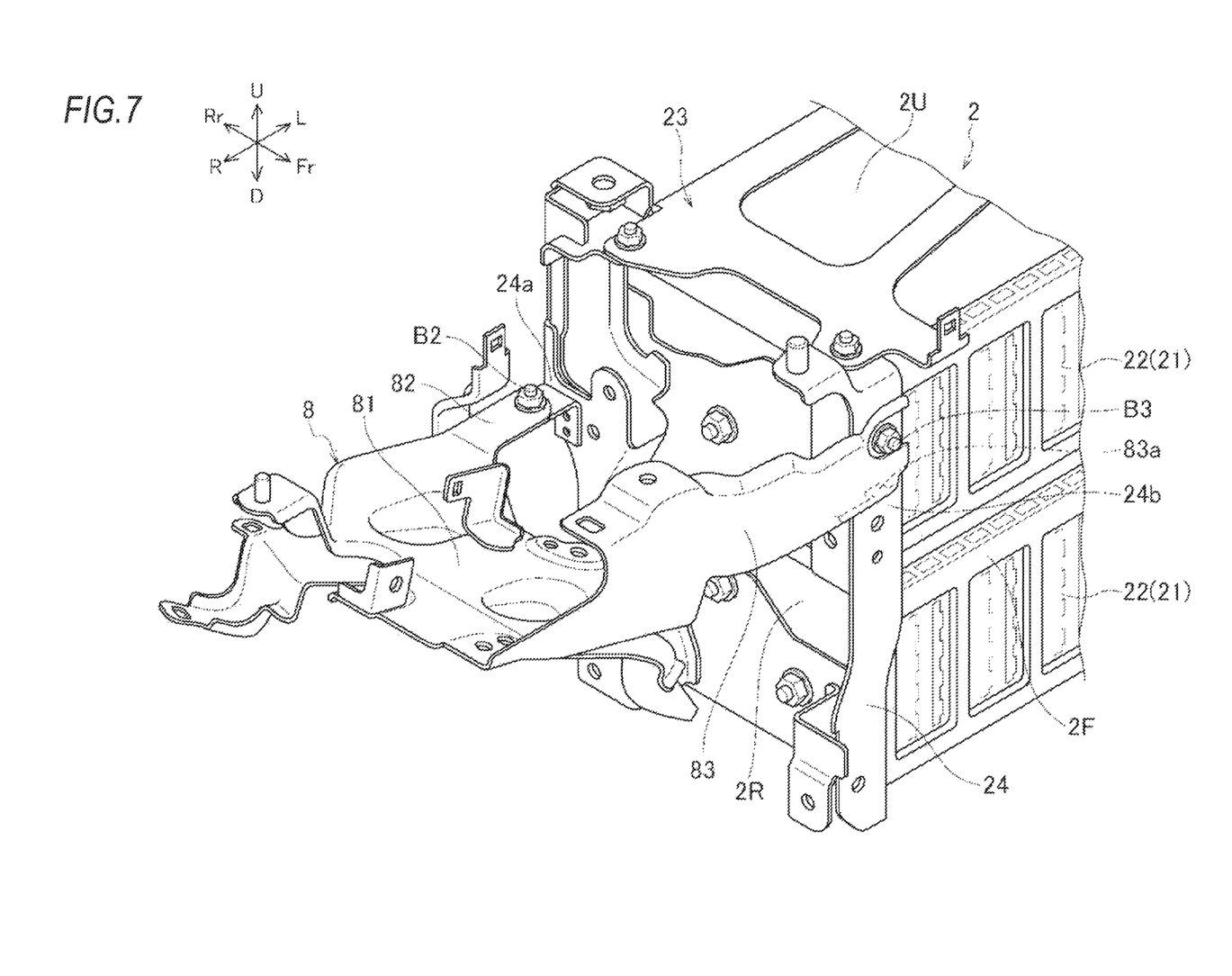
FIG. 7 is a perspective view illustrating the right side portion of the battery to which a bracket is attached.

As illustrated in FIGS. 7 to 9, the bracket 8 of the embodiment includes a bracket body 81 having a plate shape, a first fixing portion 82 extending from the bracket body 81 toward the battery 2 and fixed to the right side surface 2R side of the battery 2, and a second fixing portion 83 extending from the bracket body 81 toward the battery 2 and fixed to a front surface 2F side perpendicular to the right side surface 2R. According to such fixing portions 82 and 83, it is possible to firmly fix the bracket 8 on two surfaces of the battery 2.

Figure 6:
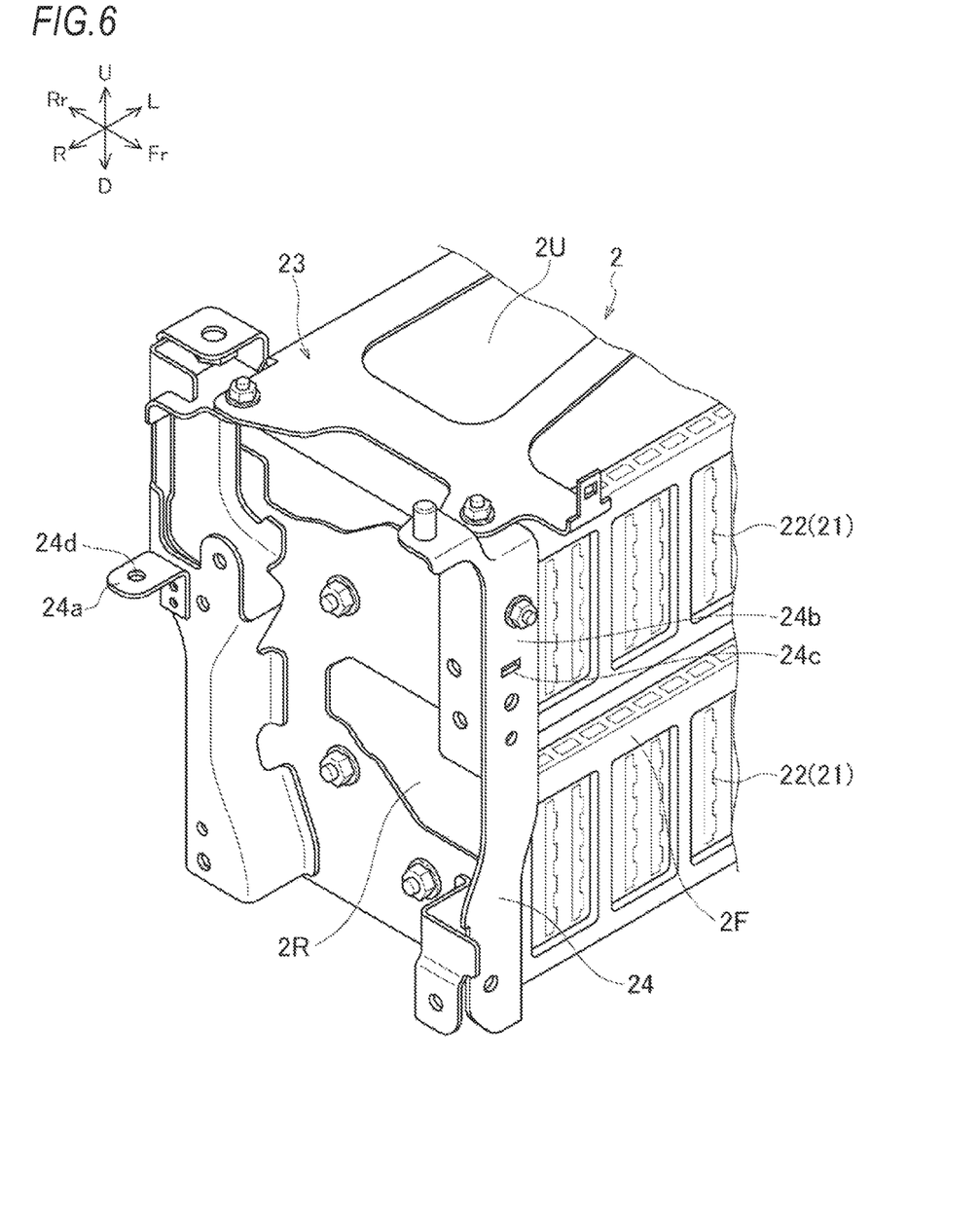
FIG. 6 is a perspective view illustrating a right side portion of a battery.

As illustrated in FIG. 6, the battery frame 23 includes a pair of side frames 24 which hold side portions of the battery 2. Hereinafter, only the side frame 24 on the right side will be described. A first fixing portion 24a to which the first fixing portion 82 of the bracket 8 is fixed is provided on a right side portion of the side frame 24 and a second fixing portion 24b to which the second fixing portion 83 of the bracket 8 is fixed is provided on a front surface of the side frame 24. The first fixing portion 24a of the side frame 24 includes a bolt insertion hole 24d penetrating in a vertical direction and the first fixing portion 82 of the bracket 8 is fastened via a bolt B2 inserted through the bolt insertion hole 24d.

As illustrated in FIG. 6, the second fixing portion 24b of the side frame 24 includes a fitting hole 24c having a long hole shape. A fitting protrusion 83a (see FIG. 7) formed on the second fixing portion 83 of the bracket 8 fits into the fitting hole 24c. As a result, the second fixing portion 83 of the bracket 8 is fixed to the second fixing portion 24b of the side frame 24.

SUMMARY

From the embodiment described above, the following aspects are extracted. Although corresponding elements in the embodiment described above are indicated in parentheses, it is not limited thereto.

(1) A battery unit (battery unit 1) mounted on a vehicle (vehicle V), including:
a battery (battery 2);
a first electric junction box (first electric junction box BOX1) electrically connected to the battery;
a second electric junction box (second electric junction box BOX2) electrically connected to the battery; and
a case (case 3) accommodating the battery, the first electric junction box, and the second electric junction box, wherein
the battery, the first electric junction box, and the second electric junction box are arranged in this order in a vehicle width direction,
the first electric junction box is disposed along a side surface (right side surface 2R) of one side of the battery in the vehicle width direction, and
the second electric junction box is held by a bracket (bracket 8) which is inclined upward or downward, as the second electric junction box is separated from the first electric junction box in the vehicle width direction.

(2) The battery unit according to (1), wherein
the first electric junction box is disposed on a first electric power transmission path (first electric power transmission path 51) between a first electric device (first electric device E1) and the battery,
the second electric junction box is disposed on a second electric power transmission path (second electric power transmission path 52) which branches off from the first electric power transmission path and transmits electric power to a second electric device (second electric device E2),
a switching element (first to third switching elements 53, 54, and 55) that controls electric power supply and a circuit breaker (first circuit breaker 57) that shuts off the first electric power transmission path are provided in the first electric junction box, and
a circuit breaker (second circuit breaker 58) that shuts off the second electric power transmission path is provided in the second electric junction box.

(3) The battery unit according to (1) or (2), wherein
a cooling fan (cooling fan 44) which takes in cooling air for cooling the battery into the case is accommodated in the case, and
the second electric junction box and the cooling fan are held by the bracket.

(4) The battery unit according to (3), wherein
the second electric junction box is held on an upper surface of the bracket, and
the cooling fan is held on a lower surface of the bracket.

(5) The battery unit according to any one of (1) to (4), wherein
the bracket includes
a bracket body (bracket body 81) having a plate shape,
a first fixing portion (first fixing portion 82) extending from the bracket body toward the battery and fixed to a side of the side surface of the battery, and
a second fixing portion (second fixing portion 83) extending from the bracket body toward the battery and fixed to a side of a surface (side surface 2F) perpendicular to the side surface.

(6) The battery unit according to any one of (1) to (5), wherein
an electronic control unit (electronic control unit 71) that controls the battery is disposed on an upper surface (upper surface 2U) of the battery, and
a connection line (connection line 72) that electrically connects the battery and the electronic control unit is arranged between the battery and the first electric junction box in the vehicle width direction.

According to (1), the battery, the first electric junction box, and the second electric junction box are arranged in this order in the vehicle width direction and the first electric junction box is disposed along the side surface of one side of the battery in the vehicle width direction, and further, the second electric junction box is held by the bracket which is inclined upward or downward, as the second electric junction box is separated from the first electric junction box in the vehicle width direction. Therefore, it is possible to secure a compression stroke in the event of a vehicle side collision by the deformation of the bracket. That is, when a side collision load is input, the posture of the second electric junction box changes from an inclined attitude to a vertical attitude by the deformation of the bracket. Thus, compared to a case where the bracket and the second electric junction box are arranged in a horizontal attitude, the side collision load is less likely to be input to the first electric junction box or the battery. Therefore, when important components are provided in the first electric junction box, it is possible to protect the important components by controlling the deformation in the event of crushing.

According to (2), the first electric junction box is disposed on the first electric power transmission path between the first electric device and the battery and the second electric junction box is disposed on the second electric power transmission path which branches off from the first electric power transmission path and transmits electric power to the second electric device, and further, the switching element for controlling electric power supply and the circuit breaker for shutting off the first electric power transmission path are provided in the first electric junction box and the circuit breaker for shutting off the second electric power transmission path is provided in the second electric junction box. Therefore, when the vehicle side collision occurs, it is possible to prevent the destruction of the switching elements (important components) provided in the first electric junction box while the destruction of the circuit breaker provided in the second electric junction box is allowed. In addition, the first electric power transmission path does not pass through the circuit breaker provided in the second electric junction box, and thus electric power can be supplied between the battery and the first electric device even when the circuit breaker provided in the second electric junction box is broken.

According to (3), the cooling fan which takes in cooling air for cooling the battery into the case is accommodated in the case of the battery unit and the second electric junction box and the cooling fan are held by the bracket. Therefore, the number of parts can be reduced as compared to a case where the second electric junction box and the cooling fan are held by separate brackets.

According to (4), the second electric junction box is held on the upper surface of the bracket, and the cooling fan is held by the lower surface of the bracket. Therefore, the second electric junction box and the cooling fan can be held compactly.

According to (5), the bracket includes the bracket body having a plate shape, the first fixing portion extending from the bracket body toward the battery and fixed to the side surface side of the battery, and the second fixing portion extending from the bracket body toward the battery and fixed to a surface side perpendicular to the side surface. Therefore, it is possible to firmly fix the bracket on the two surfaces of the battery.

According to (6), the electronic control unit for controlling the battery is disposed on the upper surface of the battery and the connection line for electrically connecting the battery and the electronic control unit is arranged between the battery and the first electric junction box in the vehicle width direction. Therefore, it is possible to protect the connection line using the space formed between the battery and the first electric junction box.

The invention is not limited to the embodiment and the modification example described above and modifications, improvements, and the like are possible as appropriate.

For example, the bracket 8 of the embodiment is inclined upward, as it separates from the first electric junction box BOX1 in the vehicle width direction. However, it may be inclined downward, as it separates from the first electric junction box BOX1 in the vehicle width direction.

Further, the battery 2, the first electric junction box BOX1 and the second electric junction box BOX2 may be arranged in this order from the right side to the left side in the vehicle width direction.

Further, in the embodiment described above, the invention is described by exemplifying a case where the electric power of the battery 2 is supplied in parallel to the two electric devices E1 and E2. However, the number of electric devices which receive the electric power of the battery 2 and the circuit configuration which connects the battery 2 and the electric device are not limited to the embodiment described above.

The invention claimed is:

1. A battery unit mounted on a vehicle, comprising:
   a battery;
   a first electric junction box electrically connected to the battery;
   a second electric junction box electrically connected to the battery; and
   a case accommodating the battery, the first electric junction box, and the second electric junction box, wherein
   the battery, the first electric junction box, and the second electric junction box are arranged in this order in a vehicle width direction,
   the first electric junction box is disposed along a side surface of one side of the battery in the vehicle width direction,
   the second electric junction box is held by a bracket which is inclined upward or downward, as the second electric junction box is separated from the first electric junction box in the vehicle width direction,
   the first electric junction box is disposed on a first electric power transmission path between a first electric device and the battery,
   the second electric junction box is disposed on a second electric power transmission path which branches off from the first electric power transmission path and transmits electric power to a second electric device,
   a switching element that controls electric power supply and a circuit breaker that shuts off the first electric power transmission path are provided in the first electric junction box, and
   a circuit breaker that shuts off the second electric power transmission path is provided in the second electric junction box.

2. The battery unit according to claim 1, wherein
   the bracket includes
   a bracket body having a plate shape,
   a first fixing portion extending from the bracket body toward the battery and fixed to a side of the side surface of the battery, and
   a second fixing portion extending from the bracket body toward the battery and fixed to a side of a surface perpendicular to the side surface.

3. The battery unit according to claim 1, wherein
   an electronic control unit that controls the battery is disposed on an upper surface of the battery, and
   a connection line that electrically connects the battery and the electronic control unit is arranged between the battery and the first electric junction box in the vehicle width direction.

4. A battery unit mounted on a vehicle, comprising:
   a battery;
   a first electric junction box electrically connected to the battery;
   a second electric junction box electrically connected to the battery; and
   a case accommodating the battery, the first electric junction box, and the second electric junction box, wherein
   the battery, the first electric junction box, and the second electric junction box are arranged in this order in a vehicle width direction,
   the first electric junction box is disposed along a side surface of one side of the battery in the vehicle width direction,
   the second electric junction box is held by a bracket which is inclined upward or downward, as the second electric junction box is separated from the first electric junction box in the vehicle width direction,
   a cooling fan that takes in cooling air for cooling the battery into the case is accommodated in the case, and
   the second electric junction box and the cooling fan are held by the bracket.

5. The battery unit according to claim 4, wherein
   the second electric junction box is held on an upper surface of the bracket, and the cooling fan is held on a lower surface of the bracket.

6. The battery unit according to claim 4, wherein
   the bracket includes
   a bracket body having a plate shape,
   a first fixing portion extending from the bracket body toward the battery and fixed to a side of the side surface of the battery, and
   a second fixing portion extending from the bracket body toward the battery and fixed to a side of a surface perpendicular to the side surface.

7. The battery unit according to claim 4, wherein
   an electronic control unit that controls the battery is disposed on an upper surface of the battery, and a connection line that electrically connects the battery and the electronic control unit is arranged between the battery and the first electric junction box in the vehicle width direction.

\* \* \* \* \*